April 15, 1958 R. J. COAR 2,830,436
FUEL CONTROL SYSTEM FOR TURBOJET ENGINE WITH AFTERBURNER
Filed April 26, 1952 5 Sheets-Sheet 4

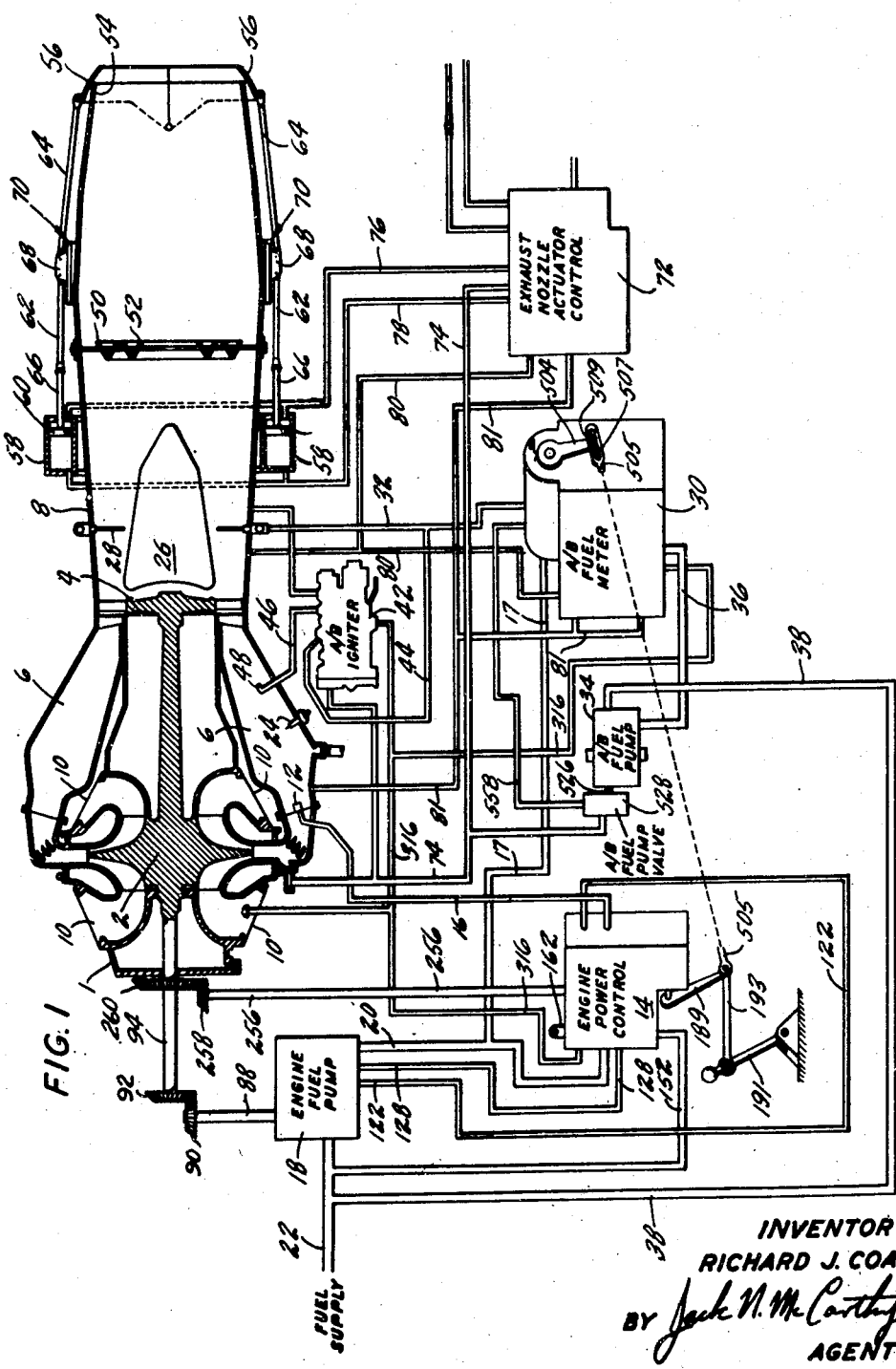
FIG. I
INVENTOR
RICHARD J. COAR
BY Jack N. McCarthy
AGENT

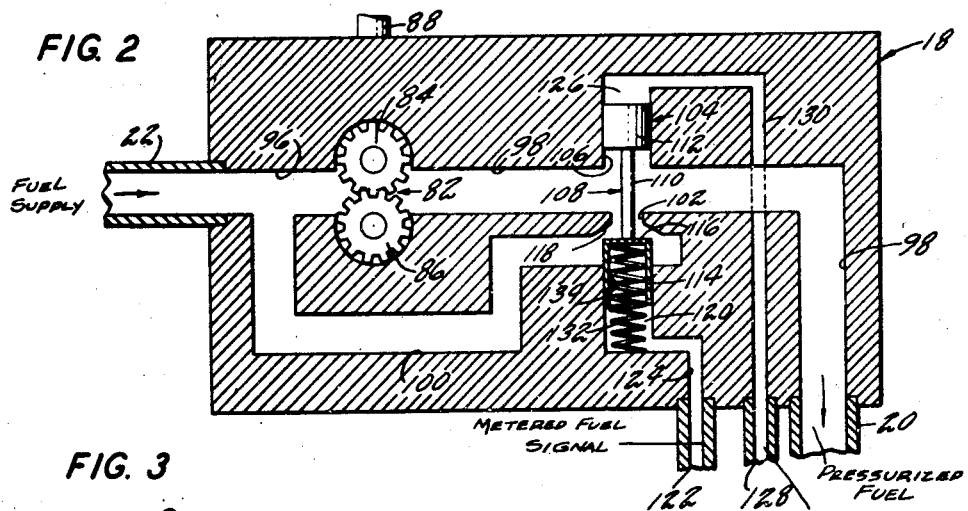
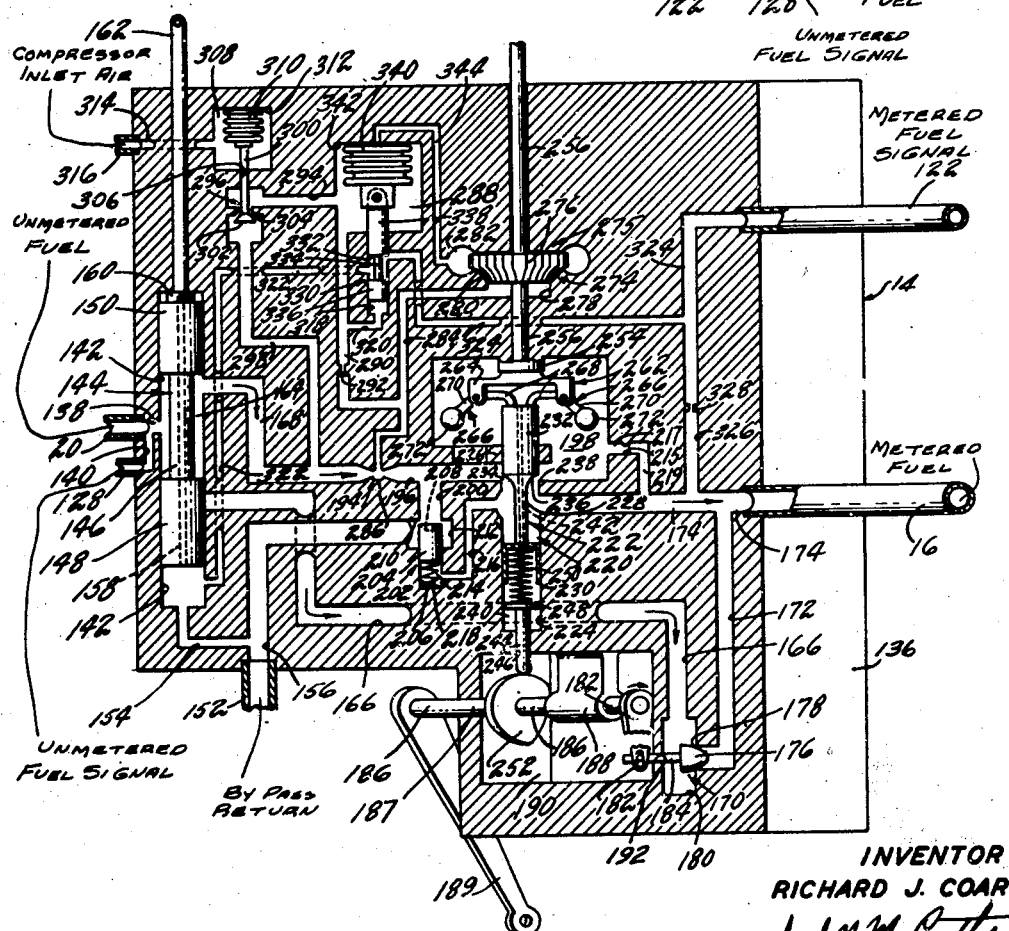

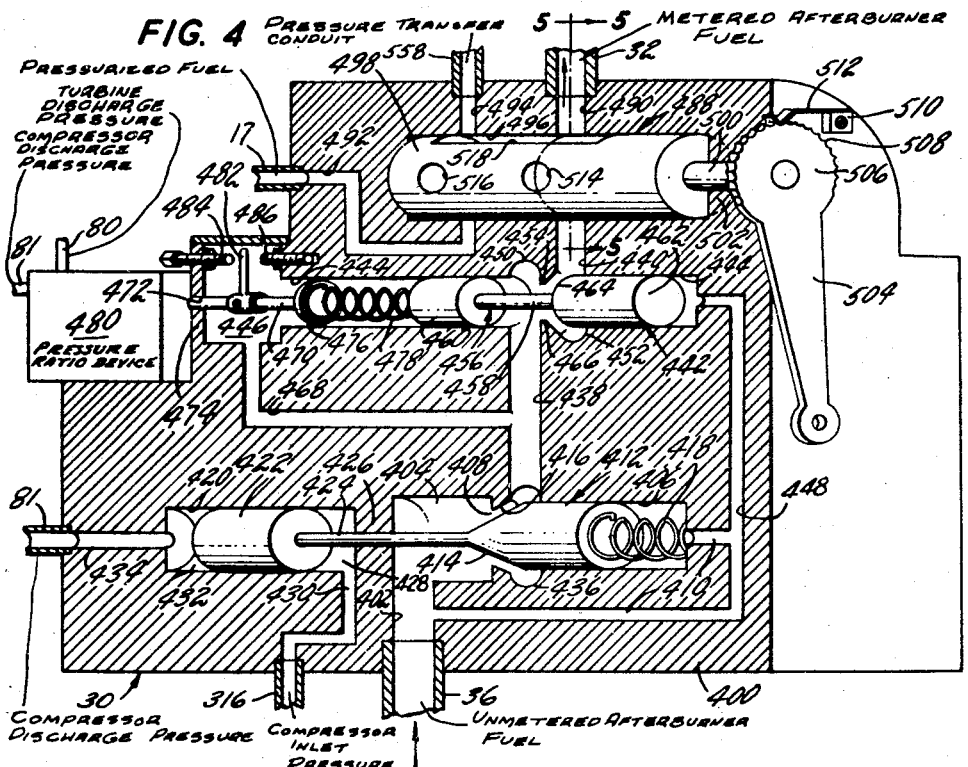

INVENTOR
RICHARD J. COAR
BY Jack N. McCarthy
AGENT

April 15, 1958        R. J. COAR        2,830,436
FUEL CONTROL SYSTEM FOR TURBOJET ENGINE WITH AFTERBURNER
Filed April 26, 1952        5 Sheets-Sheet 5

INVENTOR
RICHARD J. COAR
BY *Jack N. McCarthy*
AGENT

United States Patent Office 2,830,436
Patented Apr. 15, 1958

2,830,436

FUEL CONTROL SYSTEM FOR TURBOJET ENGINE WITH AFTERBURNER

Richard J. Coar, Hartford, Conn., assignor to United Aircraft Corporation, East Hartford, Conn., a corporation of Delaware Application April 26, 1952, Serial No. 284,518

60 Claims. (Cl. 60—39.28)

This invention relates to an integrated hydromechanical fuel control system for a turbojet engine including an afterburner, although it is not limited thereto.

An object of this invention is to provide a means for varying the engine thrust during afterburning operation of an engine whose exhaust nozzle area during such operation is constant.

Another object of this invention is to provide a novel means for metering the desired fuel flow to the afterburner.

A further object of this invention is to provide a control means for starting and stopping the afterburner fuel pump.

Another object of this invention is to provide an engine control having provisions for emergency operation and being adaptable for operation with a fixed displacement fuel pump.

A further object of this invention is to provide control of the fuel pump delivery by separate methods for both primary and emergency operation of the engine control.

Another object of this invention is to provide primary and emergency methods of engine control adaptable with a dual fixed displacement fuel pump.

Further objects and advantages will be apparent from the following specification and drawings:

Fig. 1 is a schematic view of a turbojet engine including an afterburner showing the control system.

Fig. 2 is an enlarged schematic view of the fuel pump.

Fig. 3 is an enlarged schematic view partially in perspective of the engine power control.

Fig. 4 is an enlarged schematic view in perspective of the afterburner fuel meter.

Fig. 5 is a view taken along the line 5—5 of Fig. 4.

Fig. 6 is an enlarged schematic view of the afterburner fuel pump.

Fig. 7 is an enlarged schematic view of the afterburner fuel pump air valve.

Figure 8:
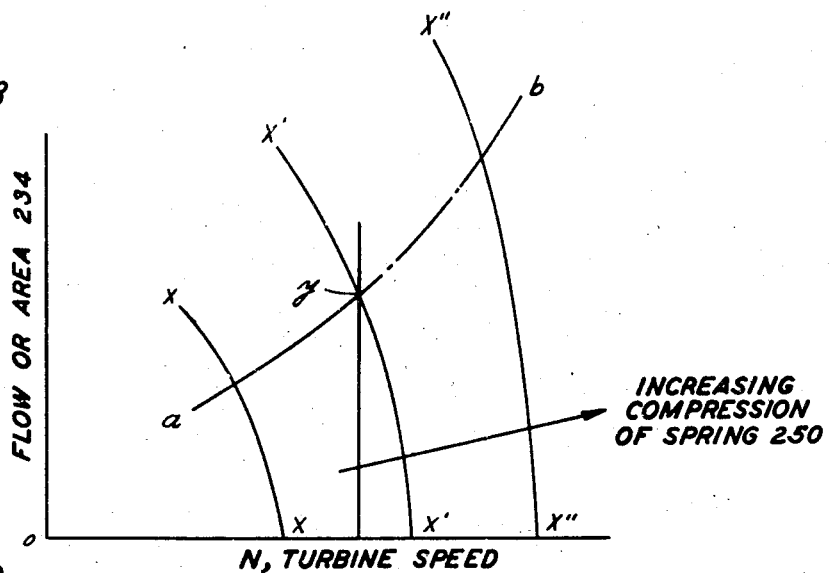
Fig. 8 is a chart wherein the flow, or area of orifice 234, is plotted against N, the turbine speed, for various compression settings of spring 250.

With reference to Fig. 1, the turbojet engine 1 has a compressor 2, which, in the arrangement shown, is a centrifugal type, driven by a turbine 4. Combustion chambers 6 therebetween deliver air from the compressor to the turbine, and an afterburner 8 is attached at the turbine outlet to provide a means of increasing the thrust.

The engine has two axially spaced intake openings 10 to direct the incoming air into the two oppositely facing annular compressor inlets. Compressed air discharged from the compressor 2 passes to the turbine through the combustion chambers 6 where it is mixed with fuel from fuel nozzles 12. These fuel nozzles 12 receive fuel from the engine power control 14 through conduit 16. Lever 189 and rod 162 regulate the engine power control in a manner to be hereinafter described. The engine power control 14 receives fuel from the fuel pump 18 through conduit 20. Conduits 122 and 128 sense pressures in the engine power control 14 and are connected to the fuel pump 18 in a manner to be hereinafter described. This fuel pump 18 is connected to a fuel supply by the fuel supply conduit 22. The fuel air mixture is initially ignited within the combustion chambers 6 by a spark ignitor 24. Elements of the dual fuel pump 18 and engine power control 14 are driven from an extension of the compressor shaft in a manner to be hereinafter described.

From the turbine the gas is passed around a cone 26 to the diffuser section of the afterburner 8. When the afterburner is operating, fuel is discharged into these gases from a plurality of fuel nozzles 28 located in the diffuser section. These fuel nozzles 28 receive fuel from the afterburner fuel meter 30 through conduit 32. Lever 504 regulates the afterburner fuel meter in a manner to be hereinafter described. The afterburner fuel meter 30 receives fuel from the afterburner fuel pump 34 through conduit 36. The afterburner fuel pump 34 receives fuel from the fuel supply conduit 22 through conduit 38.

Since the gases leaving the turbine 4 contain a considerable amount of unburned oxygen, the additional fuel introduced by fuel nozzles 28 provides a combustible mixture which may be initially ignited within combustion chamber 40 of the afterburner by any ignition means desired. The afterburner igniter 42 herein shown is described in detail and claimed in copending application Serial No. 196,426 of Richard J. Coar filed November 18, 1950, now Patent No. 2,819,587 issued January 14, 1958.

This igniter control 42 injects an amount of fuel in addition to that normally supplied to a combustion chamber 6 where it is ignited, resulting in flame propagation through the turbine into the afterburner for igniting the combustible mixture in the afterburner. Fuel is provided to the igniter control 42 from the afterburner fuel conduit 32 by conduit 44 and is injected into the combustion chamber 6 through conduit 46 and nozzle 48. A similar igniter is described and claimed in copending application Serial No. 196,402 of Carlton W. Bristol, Jr., filed November 18, 1950, now Patent No. 2,780,055 issued February 5, 1957. The burning of this combustible mixture is stabilized in the combustion chamber of the afterburner by flameholders 50 and 52. The burned gases discharge from the engine through the nozzle 54 whose area can be varied.

The variable nozzle 56 operates between a minimum opening for engine operation without afterburner and a maximum opening for operation of the engine with afterburner. A nozzle and actuating system, similar to the one shown with this invention is shown and claimed in copending application Serial No. 193,734, filed November 2, 1950, now Patent No. 2,714,285 issued August 2, 1955. The actuating system consists of the cylinder 58, piston 60, connecting control rod 62, nozzle control rod 64, piston rod 66, a car 68, and a track mechanism 70 for said car to open or close the exhaust nozzle 56 as required.

An exhaust nozzle actuator control 72 is used to divert a pressure to one side or the other of the exhaust nozzle actuating cylinders 58. Compressed air from the compressor is delivered to the nozzle control 72 by conduit 74 to provide the operating pressure. Conduit 76 connects the nozzle control to the side of the cylinders 58 nearest to the nozzle which causes the nozzle to open when the operating pressure is applied thereto. Conduit 78 connects the nozzle control to the side of the cylinders 58 farthest from the nozzle which causes the nozzle to close when the operating pressure is applied thereto. Turbine discharge pressure which is delivered to the control 72 by conduit 80, and compressor discharge air which is delivered by conduit 81, automatically controls this nozzle control 72 to connect conduit 74 to either conduit 76 or 78. An exhaust nozzle actuator control of this type is shown and claimed in copending application Serial No. 196,424 of Richard J. Coar, filed November 18, 1950, now Patent No. 2,715,311 issued August 16, 1955, and the connection of said exhaust nozzle actuator control to an engine and afterburner as shown in Fig. 1 is also shown in copending application Serial No. 196,425 of Richard J. Coar and William H. Brown, filed November 18, 1950, now Patent No. 2,780,054 issued February 5, 1957.

With reference to Fig. 2, the fuel pump 18 has a gear pump 82 consisting of two gears 84 and 86 driven by a shaft 88 from a bevel gear 90 which is in turn driven by a bevel gear 92 fixed to a shaft 94 on the compressor 2. Fuel is supplied to this pump 18 through a conduit 22 and is discharged through a conduit 20 to the engine power control 14. Conduit 22 is connected to an inlet passageway 96 which is in turn connected to the inlet at gear pump 82. The outlet from the pump is connected to a passageway 98 which is in turn connected to conduit 20. Passageway 98 is connected to a passageway 100 by a port 102 which cooperates with a regulating valve 104 in a manner hereinafter described. Passageway 100 is connected at its other end to inlet passageway 96.

The regulating valve 104 includes a bore 106 which intersects passageways 98 and 100 with port 102 being formed therebetween. Within bore 106 is a valve member 108 which consists of a piston having a reduced portion 110 and two lands 112 and 114. Land 112 slidably engages bore 106 adjacent passage 98, and land 114 slidably engages bore 106 below port 102. This land 114 extends across passageway 100 and brings an edge 116 to a seat 118 of port 102 to form a variable orifice. Chamber 120 formed between land 114 and the one end of bore 106 is connected to conduit 122 by passageway 124. Chamber 126 formed between land 112 and the other end of bore 106 is connected to conduit 128 by passageway 130. A spring 132 is located in chamber 120 between a spring seat 134 and the end of land 114 and the end of bore 106 so as to urge the edge 116 of land 114 in a direction towards the seat 118. While for purposes of simplifying the explanation of the functioning of the control system the fuel pump 18 has been shown as consisting of a single stage, the method of operation hereinafter described is equally applicable to dual fuel pumps of the type described in copending application Serial No. 284,517 of Richard J. Coar, filed April 26, 1952, for Dual Fuel Pump, now Patent No. 2,780,172 issued February 5, 1957.

With reference to Fig. 3, the engine power control 14 includes a housing 136 with a passageway 138 which is connected to conduit 20 which delivers fuel to the control. Conduit 128 senses the pressure at the inlet to the control and is connected to a passageway 140 which is in turn connected to passageway 138. The other end of passageway 138 is connected to a bore 142 in which a valve member 144 is slidably mounted. The valve member 144 consists of a piston having a reduced portion 146 and two lands 148 and 150 thereon.

The ends of bore 142 are each connected to a bypass return conduit 152 which is in turn connected to fuel conduit 22. The end of bore 142 adjacent land 148 is connected by a passageway 154 and passageway 156, while the other end of bore 142 adjacent land 150 is connected by a passageway 158 through the length of valve member 144 to passageways 154 and 156, just referred to. The valve member 144 has a stop 160 on the end adjacent land 150 which permits the end of passageway 158 to be connected to that end of bore 142.

A selector rod 162 is attached to stop 160 for moving valve member 144 either to the down or to the up position. The rod 162 may be actuated manually, through a suitable solenoid, electric motor, or by other means. When valve member 144 is positioned to the bottom of bore 142 for emergency control operation, annulus 164, formed around the reduced portion 146 of the valve member 144, connects passageway 138 to a passageway 166, and when valve member 144 is positioned to the top of bore 142 for primary control operation, annulus 164 connects passageway 138 to a passageway 168. The control is shown with the rod positioned for primary control operation.

Passageway 166 is connected through an emergency metering valve 170 and a passageway 172 to a passageway 174 which is in turn connected to conduit 16. The emergency metering valve consists of a contoured valve member 176 which cooperates with a valve seat 178 formed between passageways 166 and 172 in a chamber 180 providing a variable orifice. The valve member 176 is connected to the free end of a lever arm 182 through a stem 184. Lever arm 182 is affixed to a control lever shaft 186 mounted in a bearing which is fixed in a chamber 190 so that as the shaft is rotated the metering area of the valve 170 is varied. This shaft extends through a hole 187 in housing 136 to the exterior of said housing and has a control lever 189 attached thereto. This control lever 189 is connected to a pilot's operating lever 191 by a rod 193. The stem 184 extends through a hole 192 in the wall between chambers 180 and 190.

Passageway 168 is connected to the entrance of a venturi 194 and a passageway 196 is connected to the venturi exit. This exit passageway 196 is connected to a chamber 198 and by a passageway 200 to a pressure control valve 202. Pressure control valve 202 consists of a piston member 204 slidably mounted in bore 206. This piston member 204 has a concave face 208 which cooperates with a valve seat 210 formed at the end of passageway 200. An annulus 212 is located adjacent seat 210 around the end of piston member 204 having the concave face 208. This annulus is connected to the bypass return conduit 152 by passageway 156. Chamber 214 formed between the closed end of bore 206 and the piston member 204 is connected by passageway 216 to passageway 174, which as stated hereinbefore is connected to conduit 16. A spring 218 is located in chamber 214 between the closed end of bore 206 and piston member 204 and urges piston member 204 in a direction to close the orifice formed between seat 210 and face 208 of said piston.

Chamber 198 is connected through a governor valve 220 to passageway 174. Governor valve 220 consists of a valve member 222 slidably mounted in a bore 224, which is open at one end to chamber 198, and in bushing 226 which is supported in chamber 198. Valve member 222 is a piston having a reduced portion 228 and two lands 230 and 232 thereon. Land 230 has slidable engagement with bore 224, and land 232 has slidable engagement with bushing 226. Passage 174 intersects bore 224 adjacent chamber 198 and between land 230 and said chamber. Chamber 198 is also connected to passageway 174 by passageway 217, fixed restriction 215 and passageway 219.

A variable orifice 234 is formed between chamber 198 and passageway 174 by the cooperation of a contoured face 236 on the inner side of land 232 and the edge 238 formed at the intersection of bore 224 with chamber 198.

Chamber 240 formed between the closed end of bore 224 and land 230 is connected by a passageway 242 through the center of valve member 222 to chamber 198. A rod 244 is slidably mounted in a hole 246 between chamber 240 and chamber 190. This rod enters axially into chamber 240 from the closed end and has an enlarged portion 248 thereon. A spring 250 is located in chamber 240 between the enlarged portion 248 of rod 244 and land 230. This spring 250 urges rod 244 into contact with cam 252 in chamber 190, which is fixed to the control lever shaft 186. The cam 252 incorporates a contoured periphery so that the rotation of said shaft may vary the load imposed on valve member 222 by spring 250.

Also located in chamber 198 is a circular boss 254 extending from the side thereof coaxially with bore 224. A shaft 256 extends through said boss into said chamber and through said housing to the exterior of the control and has a bevel gear 258 fixed thereto. This bevel gear 258 is in turn connected to a bevel gear 260 which is fixed to shaft 94 on the compressor 2. Mounted within chamber 198 on the end of shaft 256 which extends thereinto, is a governor 262 of a design well known in the art. The governor consists of a base member 264 having bell crank members 266 pivoted thereto. The arms 268 of the bell crank levers engage the end of land 232 of valve member 222 and the other arms 270 have governor flyweights 272 attached thereto.

A chamber 274 is located between chamber 198 and the exterior of the housing 136 along the axis of shaft 256. Located within said chamber is a vaned rotor 276 which is fixed to said shaft so as to rotate therewith. Chamber 274 is formed of three sections, one section 278 is circular, a second section 280 is contoured to co-operate with the vane rotor 276 to form a centrifugal pump 275, and a third section 282 is an annulus. The first section 278 of chamber 274 forming the inlet to the centrifugal pump is connected by a passageway 284 to an annulus 286 formed at the throat of the aforementioned venturi 194.

A chamber 288 is formed within housing 136 and is connected by a passageway 290 with a fixed restricting orifice 292 to passageway 284. This chamber 288 is also connected by passageway 294, compensating valve 296 and passageway 298 to passageway 168. The compensating valve 296 consists of a valve member 300 having a contoured surface 302 thereon which cooperates with a valve seat 304 formed at the junction of passageways 294 and 298 to present a variable orifice between said passageways. Valve member 300 is slidable in a bore 306 which connects the junction of passageways 294 and 298 to a chamber 308 formed in the housing. A sealed capsule 310 is affixed at one end to a wall 312 of chamber 308 and at its other end to the valve member 300. This chamber 308 is connected by a passageway 314 to conduit 316 which leads to the compressor air inlet.

A bore 318 intersects chamber 288 and is connected at its other end by a passageway 320 to passageway 290. A passageway 322 is connected to this bore 318 and to the end of bore 142 adjacent land 148 and enters bore 142 so that the opening therebetween is closed when valve member 144 is moved downward, and open when said valve is moved upward. Bore 318 is intersected by a passageway 324 between the point at which passageway 322 intersects said bore and chamber 288. This passageway 324 is connected to conduit 122 and also through passageway 326 to passageway 174. A fixed restricting orifice 328 is located in passageway 326.

A servo valve 330 is slidable within bore 318 and is formed from a piston 332 having a reduced portion 334 and two lands 336 and 338 thereon. Land 336 is located in the bore 318 between the openings formed by passageways 320 and 322, and land 338 is located between the opening of the passageway 324 and chamber 288 and extends into said chamber. The inner face of land 338 acts to form a variable orifice between passageway 324 and bore 318. A capsule 340 is affixed at one end to the wall 342 of chamber 288 and its other end to the end of land 338 which extends into said chamber. The interior of said capsule is connected by a passageway 344 to the annulus 282 which is the outlet of the centrifugal pump described above.

With reference to Fig. 4, the afterburner fuel meter 30 includes a housing 400 with a passageway 402 which is connected to conduit 36 which delivers fuel to the meter from the afterburner fuel pump 34, in a manner to be hereinafter described.

Passageway 402 is connected at its other end to a chamber 404. A bore 406 is located adjacent to said chamber 404 and is connected at one end by a port 408 thereto. The other end of bore 406 is connected by a passageway 410 to inlet passageway 402. A valve member 412 is slidably mounted within bore 406. Said valve member 412 has a contoured face 414 on one end for cooperation with a valve seat 416 of port 408 to form a variable orifice. A spring 418 is located between the other end of valve member 412 and the end of bore 406 connected to passageway 410 biasing said contoured face 414 of the valve member in a direction to close the variable orifice.

A bore 420 is formed within housing 400 adjacent the chamber 404 on the side opposite from port 408. A piston 422 is slidably mounted within bore 420. A stem 424 extends through wall 426, located between chamber 404 and bore 420, and is fixed at one end to the contoured face of valve 412 and at its other end to piston 422. The chamber 428 formed by the end of piston 422 having the stem attached thereto and the end of bore 420 is connected by passageway 430 to conduit 316 which is attached to engine air intake. The chamber 432 formed between the other end of piston 422 and bore 420 is connected by passageway 434 to conduit 81 which is connected to compressor discharge air.

An annulus 436 is formed around the end of bore 406 adjacent port 408. A passageway 438 is connected at one end to annulus 436 and is connected at its other end to passageway 440 through a pressure regulating valve 442.

This pressure regulating valve 442 includes a bore 444 which opens at one end into a chamber 446 and is connected at its other end by a passageway 448 to passageway 410. This bore intersects annuli 450 and 452 formed at the meeting ends of passageways 438 and 440, respectively, with a port 454 being formed therebetween. Within bore 444 is a valve member 456 which consists of a piston having a reduced portion 458 and two lands 460 and 462 thereon. Land 460 slidably engages bore 444 adjacent passageway 438 between said passageway and chamber 446 and land 462 slidably engages bore 444 to the right of port 454. This land 462 extends across annulus 452 and presents an edge 464 to a seat 466 of port 454 to form a variable orifice. Chamber 446 is connected to passageway 438 by passageway 468.

A rod 470 extends into chamber 446 concentric with bore 444 and is slidably mounted in a hole 472 in wall 474. An enlarged spring seat 476 is attached to the end of rod 470 located in the chamber 446. A spring 478 is located between said spring seat 476 and land 460 of valve member 456 and urges said valve member in a direction to increase the size of the variable orifice between passageways 438 and 440. Rod 470 is operatively connected at its other end to a pressure-ratio measuring device 480 which is fixed to the housing 400 of the afterburner fuel meter.

The pressure ratio device 480 is connected by conduit 81 to compressor discharge air and is connected by conduit 80 to turbine discharge pressure and operates to position rod 470 as a function of the ratio of the absolute pressures in conduits 80 and 81. A pressure-ratio measuring device of this type is shown and claimed in co-pending application Serial No. 196,424 of Richard J. Coar, filed November 18, 1950, now Patent No. 2,715,311. Fixed to rod 470 is an arm 482 which is disposed between adjustable stops 484 and 486 which serve to limit the axial travel of said rod.

Passageway 440 is connected to conduit 32 through valve 488 and passageway 490. This valve 488 also connects passageway 492, which receives fuel pressure from the engine fuel pump supply conduit 20 through conduit 17, to passageway 494. Valve 488 includes a bore 496 and a valve member 498 which is rotatably mounted therein. Said valve member has an extension shaft 500 which extends through wall 502 of the housing 400 to the exterior thereof where a lever 504 is fixed thereto. Lever 504 has at its point of attachment to shaft 500 a circular portion 506 concentric with said shaft and having serrations 508 therearound. A restraining device 510 has a member 512 which engages the serrations 508 to hold said lever in a fixed position when no force is applied thereto. This lever 504 is connected to lever 189 by a rod 505 through a lost-motion action. An elongated opening 507 at the end of rod 505 engages a pin 509 at the free end of lever 504. This connection correlates the action of the engine power control 14 and the afterburner fuel meter 30 in a manner to be hereinafter described.

Valve member 498 has a hole 514 extending therethrough perpendicular to the axis of bore 496 located in the plane of passageways 440 and 490 which enter bore 496 at diametrically opposite points. Valve member 498 has another hole 516 extending therethrough parallel to hole 514 located in the plane of passageways 494 and 492 which enter bore 496 at diametrically opposite points. The valve member 498 also has a portion 518 which is flat and extends from one side of the point where passageway 490 intersects bore 496 to the other side of the point where passageway 494 intersects said bore (see Fig. 5).

The afterburner fuel pump 34 (see Fig. 6) which delivers fuel to the afterburner fuel meter through conduit 36 is of the turbine type having a turbine rotor 520 mounted therein with an intake passage 522 and an exhaust passageway 524 for the working fluid. The turbine rotor 520 drives an impeller 527 which provides the pumping action. The working fluid, which is shown as compressed air supplied from the compressor outlet of the engine, is delivered to the intake passageway 522 by conduit 526 through conduit 74 and an afterburner pump air control valve 528, as shown in Fig. 7.

This afterburner pump control valve controls the operation of the fuel pump by controlling the flow of compressed air to the pump. This control valve 528 includes a housing 530 in which is located a closed bore 532. Two annuli 534 and 536 are located around bore 532 with a port 538 being formed therebetween. A passageway 540 is connected at one end to annulus 534 and at its other end to conduit 74. Annulus 536 is connected by passageway 542 to conduit 526. A valve member 544 is slidably mounted within bore 532. This valve member consists of a piston having reduced portion 546 and two lands 548 and 550 thereon. Land 548 slidably engages bore 532 between annulus 534 and the top end of bore 532 and land 550 slidably engages bore 532 below port 538. This land 550 extends through annulus 536 and presents an edge 552 to a seat 554 of port 538 to form a variable orifice between passageways 540 and 542.

Chamber 556 formed between land 548 and the top end of bore 532 is connected to conduit 558 by passageway 560; conduit 558 is in turn connected to passageway 494 of the afterburner fuel meter. Chamber 562 formed between land 550 and the other end of bore 532 contains a spring 564 which urges the valve member 544 in a valve closing direction. Chamber 562 is connected by a hole 566 through land 550 to the annular space between lands 548 and 550.

In operation, the control of turbine rotative speed is effected by one of two methods as described below.

One method is with the selector rod 162 in the position shown in Fig. 3, which places the valve member 144 to the top of the bore 142, this method being referred to as primary control operation. In this case the fuel entering the engine power control is regulated by the governor valve 220 and delivered to the engine fuel nozzles 12 through conduit 16. During this operation, the land 148 of valve member 144 closes the opening from bore 142 to passageway 166 so that no fuel is delivered through the emergency metering valve 170.

The second method is with the selector rod 162 positioned in the down position, which places the valve member 144 to the bottom of bore 142, this method being referred to as emergency control operation. In this case the fuel entering the engine power control is regulated by the emergency metering valve 170 and delivered to the engine fuel nozzles 12 in the same manner as before. During this operation, the land 150 of valve member 144 closes the opening from bore 142 to passageway 168 so that no fuel is delivered through the governor valve 220. Land 148 of valve member 144 closes the opening from bore 142 to passageway 322.

Operation of the engine during emergency control operation, the second method referred to above, is as follows. The flow passage from conduit 20 through annulus 164, passageway 166, valve 170, passageway 172, passageway 174, to conduit 16 is unrestricted except for the metering orifice established by the cooperation of the valve member 176 with the valve seat 178. This flow rate is then defined by the well known hydraulic relation:

$$F = KA_{170}\sqrt{P_{20} - P_{16}}$$

where—

F is the mass flow rate per unit time
K is a suitably dimensioned constant
$A_{170}$ is the metering area of the emergency metering valve
$P_{20}$ is the pressure at the control inlet conduit 20
$P_{16}$ is the pressure at the control discharge conduit 16

During such emergency control operation, there is no connection between conduit 324 and bore 142 through servo valve 330 and passageway 322, since the opening of passageway 322 into bore 142 is closed by the position of the land 148 of the valve member 144. There is therefore no flow through the fixed orifice 328 into passageway 324. There is also no steady flow through fixed orifice 328 into conduit 122, this conduit terminating in the end of chamber 120 behind the land 114 of the regulating valve 104 (see Fig. 2). As a result, there being no steady flow through fixed orifice 328, the pressure $P_{16}$ existing in conduit 16 is transmitted undiminished to chamber 120 of the regulating valve 104. The inlet pressure $P_{20}$ is transmitted to chamber 126 of the regulating valve 104.

The regulating valve 104 is so designed that the hydraulic forces on the inner ends of lands 112 and 114 are in balance. The forces acting on the valve 104 to bias the edge 116 of land 114 towards the seat 118 are the pressure $P_{16}$ in chamber 120 acting on land 114 and the force of spring 132. These forces are opposed by the pressure $P_{20}$ in chamber 126 acting on the land 112. Since lands 112 and 114 are equal in area, it follows that when the pressure differential $P_{20} - P_{16}$ exceeds a value established by the force of spring 132, the valve 104 is actuated so as to increase the area of the variable orifice formed between the edge 116 of land 114 and seat 118. The converse is true when the differential $P_{20} - P_{16}$ is less than said value, the valve 104 is then actuated so as to decrease the area of the variable orifice formed between edge 116 of land 114 and seat 118. Then, for any given flow output from the pump and any given metering area $A_{170}$, the valve 104 acts to maintain a constant differential $P_{20} - P_{16}$ by diverting the required amount of flow through port 102 and passageway 100 to the pump inlet.

With the valve 104 maintaining a fixed pressure differential $P_{20}-P_{16}$, it follows that the flow passing through the engine power control 14 during emergency control operation is directly proportional to the area $A_{170}$. The valve member 176 can be contoured to provide any desired relation of fuel flow to the rotation of the control lever shaft 186 by control lever 189. Although the valve 170 in Fig. 3 is shown as being manually operated only, this is for purposes of clarifying the various modes of operation of the pump regulator valve 104, and other means of controlling the equivalent metering area $A_{170}$ can be used to provide secondary effects such as compensation of flow rate for engine induction air pressure.

Operation of the engine during primary control operation, the first method referred to above, is as follows. The fuel passing into the passageway 168 flows through venturi 194 and establishes a pressure differential $P_{298}-P_{284}$ between the venturi inlet and throat which is proportional to the square of the flow rate, that is $C_1F^2_{194}=P_{298}-P_{284}$. This pressure differential is imposed across the combination of the variable orifice formed by compensating valve 296, and the fixed orifice 292, which are in series in a circuit comprising passageway 298, the variable orifice formed by compensating valve 296, passageway 294, chamber 288, passageway 290, and fixed orifice 292; thereby setting up a secondary flow through this circuit. This flow path has no other flow exit or entrance, and it follows that this secondary flow is the same through both the orifice formed by compensating valve 296 and fixed orifice 292, and is described by the relation $$F_s = KA_{296}\sqrt{P_{298}-P_{288}} = KA_{292}\sqrt{P_{288}-P_{284}}$$

whence $$\left(\frac{A_{296}}{A_{292}}\right)^2 = \frac{P_{288}-P_{284}}{P_{298}-P_{288}} = \frac{\Delta P_{292}}{\Delta P_{296}} \quad (a)$$

Now the sum of the pressure differentials $$\Delta P_{296} + \Delta P_{292} = P_{298} - P_{284} = C_1F^2_{194}$$

Or $$\Delta P_{296} = C_1F^2_{194} - \Delta P_{292}$$

Substitution of this in (a) gives $$\left(\frac{A_{292}}{A_{296}}\right)^2 = \frac{C_1F^2_{194}-\Delta P_{292}}{\Delta P_{292}} = \frac{C_1F^2_{194}}{\Delta P_{292}} - 1$$

and then $$P_{288}-P_{284} = \Delta P_{292} = \frac{C_1F^2_{194}}{\left(\frac{A_{292}}{A_{296}}\right)^2 + 1} \quad (b)$$

Passageway 284 is connected, as stated above, at one end to the throat of the venturi 194, and it is connected at its other end to the inlet of the centrifugal pump 275 which is driven at some fixed ratio to the turbine speed N. This pump is of a usual type where the pressure increase at the periphery relative to the inlet varies as the square of its speed. Then $$P_{344}-P_{284} = C_2N^2 \quad (c)$$

Subtracting Equation c from Equation b gives $$P_{288}-P_{344} = \frac{C_1F^2_{194}}{\left(\frac{A_{292}}{A_{296}}\right)^2 + 1} - C_2N^2 \quad (d)$$

The capsule 340 is subjected on the inside to the pressure $P_{344}$ from the centrifugal pump 275, and is subjected on the outside to the pressure $P_{288}$ of chamber 288. The capsule is attached in a manner stated hereinbefore, to the servo valve 330 which is connected at both ends to the pressure $P_{288}$ of chamber 288.

Thus when the pressure $P_{288}$ outside the capsule, exceeds the pressure $P_{344}$ inside the capsule, the servo valve 330 is caused to move up, land 338 of said valve then uncovering the opening of passageway 324 into bore 318. The fuel pump inlet pressure existing within bore 318 at this point, conducted thereto by conduit 152, passageway 156, passageway 154, the open end of bore 142 (now open since valve member 144 is positioned in its up position in Fig. 3) and passageway 322, causes a flow from the higher pressure in passageway 174 through the restriction 328 and passageway 324. This flow causes the pressure in passageway 324 and conduit 122 to become less than that in passageway 174 and therefore conduit 16. This loss in pressure in conduit 122 causes the regulating valve 104 (Fig. 2) to move in an opening direction, since this loss increases the pressure differential $P_{128}-P_{122}$ sensed by said regulating valve, relative to $P_{16}-P_{20}$. When the regulating valve 104 is moved in an opening direction more of the pump flow is diverted through passageway 100, thereby reducing the flow through conduit 20 and venturi 194. This lesser flow reduces the assumed excess of $P_{288}$ relative to $P_{344}$, as can be seen from Equation d, and the equilibrium of the servo valve 330 is reached when correspondence of pressure $P_{288}$ and $P_{344}$ obtains. Conversely, when $P_{344}$ is greater than $P_{288}$ the capsule 340 is caused to move the servo valve 330 down, the pressure in passageway 324 and conduit 122 is raised, regulating valve 104 is moved in a closing direction, and the flow $F_{194}$ is increased.

Under equilibrium conditions the servo valve 330 acts to maintain $P_{288}$ equal to $P_{344}$ or $P_{288}-P_{344}$ equal to 0. Then from Equation d equilibrium is characterized by $$C_2N^2 = \frac{C_1F^2_{194}}{\left(\frac{A_{292}}{A_{296}}\right)^2 + 1}$$

Or $$F^2_{194} = \frac{C_2}{C_1} \cdot N^2 \cdot \left[\left(\frac{A_{292}}{A_{296}}\right)^2 + 1\right]$$

In practice it is generally desirable to provide secondary means such that the constant $C_2$ actually varies with the turbine speed N. The last equation defines however in sufficient terms how the flow through the venturi 194 can be determined as a function of turbine speed N and of a second engine operating variable controlling the area $A_{296}$ of the variable orifice formed by compensating valve 296. Fig. 3 shows a sealed capsule 310, which may be gas filled or evacuated as the occasion requires, fixed at one end surrounded by engine inlet air conducted to chamber 308 by passageway 314 and conduit 316. As the density of the inlet air is reduced, the capsule 310 expands, moving the contoured surface 302 of the compensating valve 296 down, thereby increasing the area $A_{296}$ of the variable orifice. The contoured surface 302 can be provided so that the variation of fuel flow through venturi 194 conforms to some predetermined function of engine induction air pressure (or density).

Certain boundary conditions exist to provide the desired fuel flow through venturi 194, and these are observed in execution as follows: To insure that adequate pressure is always available in passageway 168 and conduits 20 and 128 to cause regulating valve 104 to open when the servo valve 330 is fully open, when the pressure in conduit 122 is equal to the pressure in conduit 152, the pressure differential equivalent of spring 132 is made less than the differential between minimum operating pressure in conduit 20 and the pressure in conduit 152. To insure that adequate flow through venturi 194 obtains whenever the servo valve 330 is fully closed, when the pressure in conduit 122 is equal to the pressure in conduit 16, the pressure differential equivalent of spring 132 is made greater than the differential between the operating pressure in conduit 20 and the pressure in conduit 16 which exists as a result of the various pressure losses taken through the primary control circuit.

The valve member 222 is balanced hydraulically, the outer end of land 232 being subjected to the pressure in chamber 198 and the outer end of land 230 being subjected to the same pressure through the passageway 242 located through the center of the valve member 222. The inner edges of lands 232 and 230 are subjected to the pressure of the fuel in passageway 174 after passing through variable orifice 234. The fuel pressure differential across this variable orifice 234 is maintained constant by the pressure control valve 202, the up-stream pressure $P_{198}$ being imposed on the concave face 208 of piston member 204, and the downstream pressure $P_{174}$ being imposed on the other end of piston member 204. The force of spring 218 urging piston member 204 closed against valve seat 210 acts in conjunction with the pressure $P_{174}$ across the area of piston member 204 and is opposed by the pressure $P_{198}$ acting on the same area.

When the pressure differential $P_{198}-P_{174}$ exceeds the equivalent force of spring 218, piston member 204 is moved in an opening direction off of the valve seat 210. The pressure in passageway 200 being greater than the pressure in passageway 156, fuel flows out through the variable orifice formed between valve seat 210 and the concave face 208 of said piston member to the fuel supply conduit 22 through passageway 156 and conduit 152. Since the flow into chamber 198 is regulated by venturi 194 and servo valve 330, in the manner described heretofore, when more of this flow is diverted through the variable orifice formed by the concave face 208 of piston member 204 and valve seat 210, less is available to flow through variable orifice 234. It is seen then that the action of pressure control 202 is to divert the required amount of the flow $F_{194}$ to maintain the differential of the pressure in chamber 198 to the pressure in passageway 174 ($P_{198}-P_{174}$) at a constant value according to the force of spring 218. This differential pressure must be less than the differential pressure equivalent of spring 132 for reasons previously mentioned.

Now, since the pressure differential $P_{198}-P_{174}$ is maintained constant, it follows that any flow from chamber 198 to passageway 174 is directly proportional to the metering area imposed therebetween. In Fig. 3, this variable orifice 234 has its area varied by the sliding of valve member 222. As previously noted, valve member 222 is balanced hydraulically, and its position is thus established by the relation of the force of spring 250 to the force of governor flyweights 272 acting on opposite ends of said valve member. When the speed of the governor 262 is such that the force applied to the valve member 222 is greater than the force applied to the other end of the valve member by the spring 250, the area of orifice 234 is reduced, by movement of the valve member 222 down. Conversely, when the force of spring 250 exceeds the force applied by the governor, the area of orifice 234 is increased, by movement of the valve member 222 up.

The exact variation of fuel flow through orifice 234 as the speed varies, depends on the geometry of the flyweight system of the governor 262, the rate of spring 250, and the shape of the inner face 236 of land 232 which cooperates with edge 238 to form the orifice 234; but in general, the area of orifice 234 (and therefore flow) will vary with the speed of the turbine as shown by curves X, X', and X'' for various increasing compressions of spring 250, see Fig. 8. Under steady state conditions the fuel requirement of the engine varies with the speed in a manner shown by line a—b; then when spring 250 is compressed by rod 244 so that the governor characteristic is represented by X', the governor and engine become in equilibrium at point y. This is true since if the speed of the engine should for any reason increase above that corresponding to point y the increased centrifugal force of governor flyweight 272 closes the area of orifice 234 reducing fuel flow and thereby causing the engine to decelerate. Likewise, a decrease in speed reduces the centrifugal force of flyweights 272 so that spring 250 opens the area of orifice 234, the increased fuel rate thereby accelerating the engine to point y.

Figure 9:
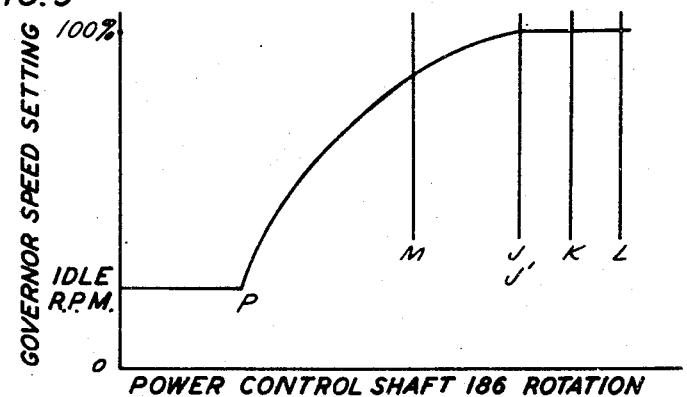
Fig. 9 is a chart wherein the governor speed setting in percent is plotted against the position of the control lever shaft 186.

The governed speed of the engine is thus established by the position of rod 244, and as stated hereinbefore, this position is controlled by the rotation of cam 252 by control lever 189. For the purpose of this invention the governor speed setting established by the surface of cam 252 is as shown in Fig. 9, an essential feature being the constant radius section of the cam which results in a constant speed setting for the last part of the rotation of said cam by control lever 189. The emergency metering valve 170, or equivalent, may be contoured to give fuel flows corresponding to the same steady state speeds relative to control lever shaft 186 rotation as the governor 262.

Now, when it is desired to accelerate the engine from one speed to another, control lever shaft 186 is rotated manually from the one speed setting to another, and in general this operation causes the area of orifice 234 to approach wide open. If the fuel supply to this orifice were not restricted the safe combustion temperature would be exceeded, but the required restriction is provided by the flow control established through venturi 194 as described hereinbefore. When orifice 234 is wide open, the variable orifice formed by concave face 208 and valve seat 210 is closed owing to a low pressure differential between the pressure in chamber 198 and the pressure in passageway 174, $P_{198}-P_{174}$, and all the flow through venturi 194, $F_{194}$, passes to the engine through conduit 16. When a deceleration from one speed to another is desired, orifice 234 tends to close fully and if the flow were so stopped, combustion would cease. This is prevented by the orifice 215 placed in parallel with variable orifice 234. Passageway 217 connects said restriction to chamber 198 and passageway 219 connects said restriction to passageway 174. A minimum flow to the engine is established through this orifice by virtue of the pressure differential $P_{198}-P_{174}$ maintained by the pressure control valve 202.

Figure 10:
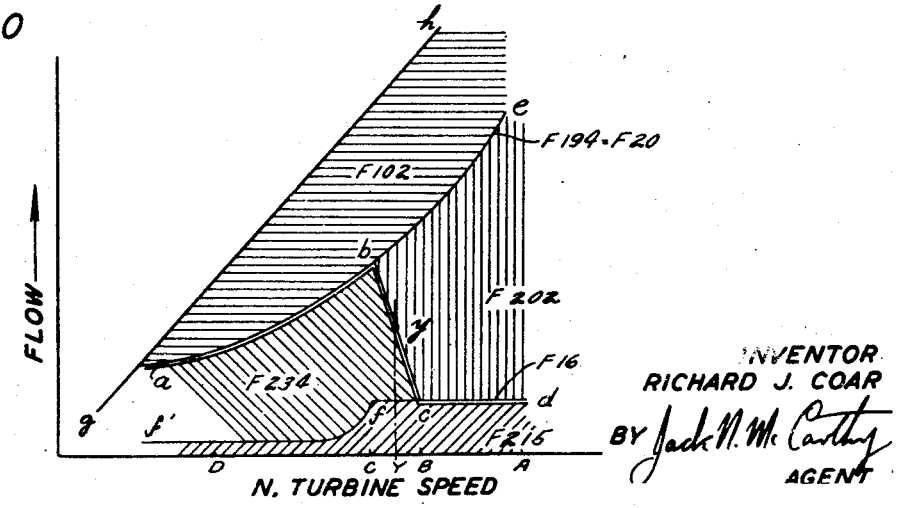
Fig. 10 is a chart wherein various flows through the control are plotted against N, the turbine speed, for primary control operation.

Fig. 10 shows graphically how the various flows are distributed during primary control operation of the turbine for a given position of lever 189. The ordinate of this chart is flow rate and the abcissa is N, turbine speed. Line g—h represents the output of the fuel pump 18, this output being proportional to turbine speed. Line a—b—e represents the flow through venturi 194 hence the flow through the conduit 20 to the engine power control 14. This flow increases with speed through the action of the centrifugal pump 275 on servo valve 330, and the line a—b—e is increased or decreased relative to the pump line g—h by the action of the compensating valve 296 also acting through servo valve 330. The flow difference between curve g—h and a—b—e is of course the difference between the output of the pump and the delivered flow in conduit 20, which is bypassed through port 102 by regulating valve 104, shown as the shaded area $F_{102}$. Reading from right to left in Figure 10, when the turbine speed is substantially higher than equilibrium operating point y (N=Y), as at N=A, the governor valve 220 is closed, and the only flow delivered to the engine is the amount metered through orifice 215 shown by line c—d, the shaded area $F_{215}$. As the engine speed reduces, approaching N=Y, the governor valve 220 commences to open as shown by the line b—c in the speed range from B to C. The flow to conduit 16 is then the flow from orifice 215 plus the flow from the governor valve 220 which is represented by the shaded area $F_{234}$. The flow difference between line b—e, $F_{194}$, and line b—c—d, $F_{16}$, is bypassed through the orifice formed between the concave face 208 of valve 202 and valve seat 210 which maintains the constant pressure differential across orifice 234 and orifice 215, shown by the shaded area $F_{202}$.

At point b the pressure control valve 202 becomes closed and can no longer regulate $P_{198}-P_{174}$ constant as the speed is reduced. As the speed lowers from N=C, all the flow from venturi 194 flows to conduit 16 through orifice 234 and fixed orifice 215, the orifice formed by valve 202 being closed, so that line section a—b represents either $F_{16}$ or $F_{194}$ in this range. Since $F_{194}$ is decreasing with speed, and since further reduction in speed causes orifice 234 to continue opening, the pressure difference $P_{198}-P_{174}$ decreases with lower speeds. This results in lesser flows through the fixed orifice 215 as shown by line section $f'-f$. Shaded area $F_{234}$ represents the portion of $F_{16}$ contributed through the orifice 234 of the governor valve 222.

Afterburner operation is started and stopped by manual rotation of lever 504, which is interconnected in a manner hereinafter described to the control lever 189. In the "off" position shown in Fig. 4, the valve 488 connects conduit 558 to conduit 32, the flat portion 518 of valve member 498 forming in conjunction with bore 496 a passage from the intersection of bore 496 and passageway 494 to the intersection of bore 496 and passageway 490. The intersections of passageways 492 and 440 with bore 496 are covered by the valve member 498. The gas pressure in the afterburner is thus connected through nozzles 28, conduit 32, passageway 490, the passage formed by the flat portion 518 and bore 496, passageway 494, conduit 558, and passageway 560 to chamber 556 of the afterburner fuel pump valve 528. The forces acting on valve member 544 are the spring 564, which holds the land 550 against seat 554 statically so that no opening exists between conduits 74 and 526, the compressor discharge pressure from conduit 74 acting on the inner face of land 548 in the same direction, and the pressure in chamber 556 acting on the outer face of land 548 in a direction to move valve member 544 to open conduit 74 to the afterburner fuel pump 34 through conduit 526. No pressure difference is imposed across land 550 since the hole 566 connects one side of the land to the other.

Afterburning operation is started by rotating the lever 504 and the attached valve member 498 to such an angle that the flat portion 518 is totally enclosed by the bore 496 and not opened to either passage 490 or 494. In this "on" position, the holes 514 and 516 are rotated so that passageway 440 is connected to passageway 490 and passageway 492 is connected to passageway 494. The high pressure fuel in conduit 17 is thereby connected to chamber 556 and overcomes the compressor discharge pressure and the spring force acting on the other end of valve member 544 so that the valve member moves downward opening conduit 74 to conduit 526. This action admits compressor discharge pressure to the turbine 520 of the afterburner fuel pump 34. This activiates the pump so that the fuel entering it through conduit 38 is delivered under pressure through conduit 36 to the afterburner fuel meter 30.

The fuel delivered to the afterburner fuel meter 30 is throttled between the inlet passageway 402 and the passageway 440 to control the delivery of said fuel through conduit 32 to the nozzles 28. The afterburner fuel pump 34 is of the "head" type, i. e., not positive displacement, and its flow delivery can be reduced by imposing a higher pressure at its discharge by reducing the area available for flow passage in the fuel discharge side. The afterburner fuel flow is metered by setting the orifice area between passageway 402 and passageway 438 and controlling the pressure difference across the orifice. The orifice area is set by the cooperation of contoured face 414 with the valve seat 416 of port 408, and the pressure differential is controlled by pressure regulating valve 442.

The contoured face 414 of valve member 412 is positioned by the balance of forces acting on it in accordance with the rate of spring 418. The valve member 412 is urged to the left by the force of spring 418 which reduces the orifice area. The pressure of passageway 402 is made to act equally on both ends of valve member 412 by the connecting passageway 410 and by use of means known to the art in effecting contoured face 414. The area of stem 424 is made so small relative to the area of piston 422 that the pressure differential acting on it in passing through wall 426 may be neglected. The only other force which acts on valve member 412 is the pressure difference acting across piston 422 in bore 420. This pressure difference is the pressure difference which exists across the engine compressor 2. As this pressure difference, $P_{81}-P_{316}$ increases, the valve member 412 moves to the right until equilibrium is established by the corresponding increase in the force of spring 418.

Now, in the engine R. P. M. range where afterburning is used, the engine air flow may be considered a unique function of the compressor pressure rise $P_{81}-P_{316}$, and by properly establishing the contoured face 414 so that the orifice area between passageways 402 and 438 is proportional to the engine air flow, the fuel/air ratio in terms of $A/B$ fuel flow and engine air flow, delivered to the afterburner will be constant for a given regulated differential $P_{402}-P_{438}$. This fuel/air ratio may be varied by controlling this differential pressure, which is done by pressure regulating valve 442.

The forces acting on pressure regulating valve 442 are as follows: the pressure in passageway 438 acts equally on the inner faces of lands 460 and 462; the pressure in passageway 402 acts on the outer face of land 462 and the pressure in passageway 438 acts on the outer face of land 460 (this pressure differential, $P_{402}-P_{438}$ acting on the equal area of the lands 460 and 462, urges valve member 456 to the left, closing the variable orifice formed between the edge 464 of land 462 and seat 466); spring 478 acts against land 460 to urge valve member 442 to the right. The rate of change of the variable area formed by the edge 464 of land 462 with seat 466 with respect to the travel of valve member 456 is so great that the full area change of said orifice is obtained with a negligible change in the force applied by spring 478. The force of spring 478 is established by the rod 470 which positions a spring seat 476.

When the force of spring 478 exceeds the force of the pressure differential $P_{402}-P_{438}$, the valve member 456 moves to the right, thereby opening the orifice formed between the edge 464 of land 462 and seat 466. This in turn results in less restriction being applied to the discharge of the afterburner fuel pump 34 so that the fuel flow rate is increased. This increased flow passing through the orifice formed by the contoured face 414 of valve member 412 and valve seat 416 increases the pressure differential $P_{402}-P_{438}$ until equilibrium is reached between this differential and the force of spring 478. Conversely, this orifice is closed to re-establish equilibrium whenever the pressure differential $P_{402}-P_{438}$ exceeds the force of spring 478. Obviously, the construction of valve 442 can be modified to control the pressure differential $P_{402}-P_{438}$ when a positive displacement pump is substituted for the afterburner fuel pump 34, or for other reasons, by placing said valve 442 upstream in the flow circuit from valve member 412 and arranging to by-pass the unwanted flow in the same manner as the valve 104 of Fig. 2.

The adjustable stops 484 and 486 form "lean" and "rich" limits, respectively, for the afterburner fuel/air ratio by acting through arm 482 to limit the minimum or maximum compression of spring 478 by rod 470. When arm 482 is in contact with either of these two stops the spring load acting on valve 442 is constant, resulting in a constant pressure differential $P_{402}-P_{438}$. As described hereinbefore, under this condition the contoured face 414 along with seat 418 provides a constant fuel/air ratio to the afterburner.

The rod 470 which enters chamber 446 through wall 474 is moved one way or the other as a function of the ratio of two absolute pressures existing in the engine gas stream. In Fig. 1, these pressures are shown as the turbine discharge pressure $P_{80}$ and the compressor discharge pressure $P_{81}$. The pressure ratio device 480 which is affixed to the housing 400 may be of the type shown and claimed in copending application Ser. No. 196,424 of Richard J. Coar, filed November 18, 1950, now Patent No. 2,715,311, as previously stated. This device acts so that rod 470 moves to the right as the ratio $P_{80}/P_{81}$ is decreased.

Figure 11:
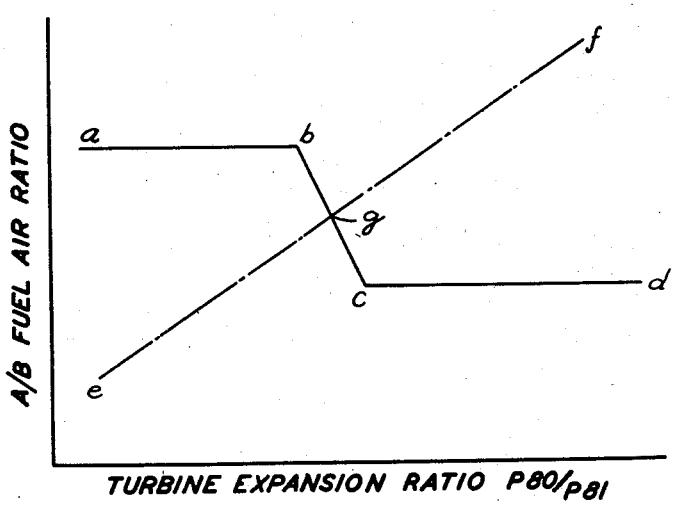
Fig. 11 is a chart wherein the afterburner fuel-air ratio is plotted against the turbine expansion ratio $P_{80}/P_{81}$.

From the foregoing it is apparent that the fuel/air ratio delivered to the afterburner is varied in accordance with the turbine expansion ratio $P_{80}/P_{81}$. This variation is described by the curve a—b—c—d in Fig. 11. At low ratios of $P_{80}/P_{81}$, the pressure ratio device 480 holds arm 482 in contact with stop 486. This results in the maximum fuel/air ratio as determined by the spring 478 and is the rich limit line a—b. When the expansion ratio $P_{80}/P_{81}$ has increased to the value corresponding to point b, the pressure ratio device 480 begins to move rod 470 to the left, thereby unloading spring 478. As the ratio $P_{80}/P_{81}$ continues to increase, the reduction of the spring load continues to lower the fuel/air ratio shown by line b—c, until the lean limit stop 484 is contacted. Further increases in the ratio $P_{80}/P_{81}$ have no effect and the lean limit fuel/air ratio is maintained as shown by line c—d. When the afterburner is in operation and the propelling nozzle size has been re-adjusted accordingly, the turbine expansion ratio $P_{80}/P_{81}$ varies in accordance with the afterburner fuel/air ratio as shown by the curve e—f in Fig. 11. It is generally desired to maintain the expansion ratio when afterburning at the same value as when not afterburning. This is the point g on curve e—f. The afterburning meter characteristic b—c is made to intersect the afterburner characteristic e—f at point g by shifting the line b—c to the right or left as may be required. This may be effected in practice by lengthening or shortening that part of rod 470 between arm 482 and the pressure ratio device 480 in some manner not shown.

When the expansion ratio is less than that of point g the afterburner fuel meter provides fuel/air ratios according to the line a—b—g. These fuel/air ratios all produce expansion ratios greater than that of point g, as can be seen from the afterburner curve g—f, and this in turn causes the afterburner fuel/air ratio to move from a—b—g towards g—c—d. However, when the afterburner fuel/air ratio is in accordance with curve g—c—d, the resulting expansion ratio is less than that of point g as can be seen from the section e—g of the afterburner characteristic. This then is measured by the pressure ratio device 480 and moves the fuel/air ratio back to section a—b—g. In practice, the necessary damping is introduced to prevent such hunting from continuing and to obtain equilibrium at the operating point g.

Use of the engine parameter $P_{80}/P_{81}$ to control the afterburner fuel/air ratio along characteristic b—c results in a fine degree of control, and allows for ready matching of the engine afterburner operating point to the non-afterburning operating point. Furthermore, the use of rich (curve a—b, Fig. 11) and lean (curve c—d, Fig. 11) fuel/air ratio limits assures a combustible fuel/air ratio in the afterburner at all times, and minimizes effects which would otherwise be felt in the event of some failure of the pressure ratio device 480.

The full range of engine operation, including afterburning, is controlled by the one lever 191, which is connected to the power control lever 189 by rod 193 and to the afterburner fuel meter lever 504 by rod 505 (see Fig. 1). First, the lever 191 rotates the shaft 186 so that the engine speed is established at corresponding values shown in Fig. 9, through the methods disclosed by Fig. 10. The valve 170 is contoured so that the fuel flow delivered through emergency control operation gives the same relation of steady state engine speed to shaft 186 rotation as the governor curve of Fig. 9, for aircraft take-off conditions. By proper application of altitude compensation to valve 170 a close correspondence of steady state engine speed versus shaft 186 rotation can be obtained between emergency and primary engine operation control for all aircraft operating conditions.

As the shaft 186 is rotated from P towards L (Fig. 9) counterclockwise as shown in Fig. 1, the lever 504 is prevented from turning by the restraining device 510. As the rod 505 is moved to the right by this rotation, the elongated opening 507 in rod 505 slides over the pin 509 in the control lever 504 until the pin abuts the left-hand end of the opening 507. Further movement of lever 191 rotates shaft 186 and causes rotation of lever 504 and valve 488 by the connection thus effected. Valve 488 is so proportioned that it remains in the "off" position when the lever 504 is at the inner end of slot 507, until shaft 186 has rotated to point K. Valve 488 then is moved to the afterburner "on" position between K and L positions of shaft 186.

Now when the lever 191 is moved in the other direction rotating shaft 186 clockwise, the valve 488 is held in the "on" position by the restraining device 510, rod 505 moving to the left while elongated opening 507 slides over pin 509. At some point, shown as M on Fig. 9, the outer end of the elongated opening 507 comes into contact with pin 509 of lever 504 and further rotation of lever 191 results in the valve 488 being moved to the "off" position. When the lever 191 is retarded from J' to M, the afterburner remains in operation. A gradual reduction in jet thrust then results primarily from the reduced engine air flow associated with the reduced engine speed shown in Fig. 9. The manner in which jet thrust varies with the position of the pilot's operating lever 191 as a result of the foregoing relations and interrelations of the control linkage is shown on Fig. 12.

If the lever 162 is selecting primary control operation, the fuel delivered to the control 14 through conduit 20 is at all times controlled by the valve 330 which actuates the valve 104 and varies according to engine speed and air density according to line a—b—c of Fig. 10. When the throttle is advanced away from idle thrust (Fig. 12) the engine accelerates with the engine fuel flow limited in accordance with curve a—b—e (Fig. 10). The equilibrium speed is established by the governor valve 220 according to the schedule in Fig. 9. Advancing the pilot's operating lever so that shaft 186 moves from point P to J results in the gradual increase of thrust shown in Fig. 12. Rotation of shaft 186 from J to K gives no change in engine speed or thrust, this range being the maximum non-afterburning thrust at maximum engine speed. When the shaft 186 is moved through K to L the valve 488 in the afterburner fuel meter is turned "on" by the linkage 405. This opens the fuel line to the afterburner fuel nozzles 28 and hydraulically actuates the afterburner fuel pump 34. The supply of fuel to the afterburner is then regulated by the afterburner fuel meter 30, and the afterburner is ignited in a manner stated hereinbefore, afterwards the propelling nozzle area is adjusted automatically in the manner shown in copending application Serial No. 196,424 of Richard J. Coar, filed November 18, 1950, now Patent No. 2,715,311. During this last phase the engine rotative speed has been held constant by the engine power control 14, and a greatly augmented thrust is then achieved as shown between K and L on Fig. 12.

Figure 12:
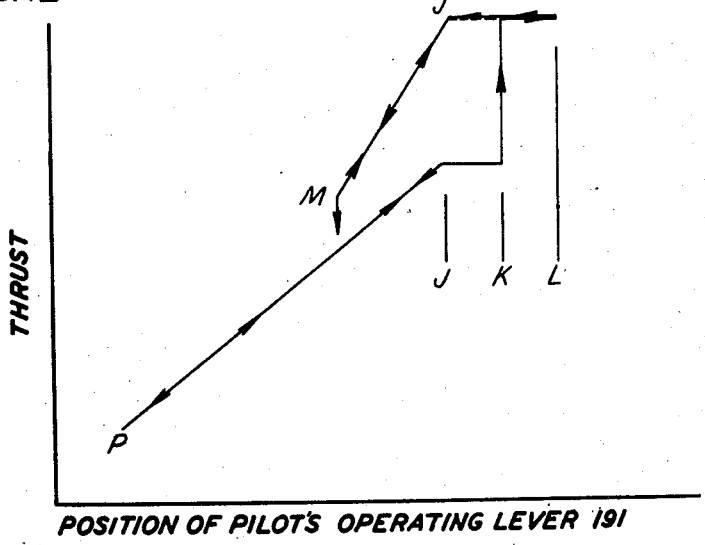
Fig. 12 is a chart wherein the thrust is plotted against the position of the pilots operating lever 191.

When the lever 191 is then retarded, the afterburner continues in operation, owing to the construction of the connection between link 505 and 504, and when retarded below J' the engine speed is reduced by the engine power control 14, resulting in the reduction in thrust shown between J' and M in Fig. 12. In this way a controllable amount of thrust can be selected between the maximum non-afterburning and afterburning values even though the propelling nozzles area is constant. At point M the rod 505 causes the valve 488 in the afterburner fuel meter 30 to move to the "off" position, stopping the flow of fuel to the afterburner and turning off the air supply to the afterburner fuel pump 34 by actuation of the afterburner fuel pump valve 528. The afterburner combustion then ceases and the propelling nozzle area is adjusted so that the thrust returns to the non-afterburning value of schedule P—J, Fig. 12. When decelerating the engine by retarding the pilot's operating lever during primary control operation of the engine power control 14, the fuel delivered to the engine is maintained according to schedule c—d of Fig. 10 to prevent loss of combustion, and a final equilibrium is established by the governor valve 220.

Operation of the engine and afterburner during emergency control operation of the engine power control 14 which may be selected by rod 162, is quite similar, except that no automatic regulation of fuel flow to the engine exists during acceleration and deceleration transients, and the valve 104 is no longer modulated by valve 330 but instead maintains a fixed pressure differential across the emergency metering elements. During emergency control operation the engine speed is not directly controlled by the governor as in primary control operation but is instead indirectly established by the schedule of steady state fuel supplied to the combustion chambers upstream of the engine turbine.

Although a specific control has been shown and described herein for purpose of illustration, it will be evident to those skilled in the art that the invention is capable of various modifications and adaptations within the scope of the appended claims.

I claim:

1. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, engine parameter responsive means within said first fuel control, and third valve means within said first control responsive to the deviation between a pressure function of the measured flow as modified by means responsive to an engine parameter and a pressure function of means responsive to another engine parameter for controlling said first valve means.

2. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, engine parameter responsive means within said first fuel control, and third valve means within said first fuel control responsive to the deviation between a pressure function of the measured flow as modified by means responsive to an engine parameter and a pressure function of means responsive to another engine parameter for controlling said first valve means.

3. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, engine parameter responsive means within said first fuel control, third valve means within said first fuel control responsive to the deviation between a pressure function of the measured flow as modified by means responsive to an engine parameter and a pressure function of means responsive to another engine parameter, and porting means in said second valve means making said first valve means responsive to said third valve means when fuel is delivered to the engine through said first fuel control.

4. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, engine parameter responsive means within said first fuel control, third valve means within said first fuel control responsive to the deviation between a pressure function of the measured flow as modified by means responsive to an engine parameter and a pressure function of means responsive to another engine parameter, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

5. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, engine parameter responsive means within said first fuel control, third valve means within said first fuel control responsive to the deviation between a pressure function of the measured flow as modified by means responsive to an engine parameter and a pressure function of means responsive to another engine parameter and porting means in said second valve means making said first valve means responsive to said third valve means when fuel is delivered to the engine through said first fuel control.

6. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, engine parameter responsive means within said first fuel control, third valve means within said first fuel control responsive to the deviation between a pressure function of the measured flow as modified by means responsive to an engine parameter and a pressure function of means responsive to another engine parameter, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

7. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, engine inlet air condition and engine speed responsive means within said first fuel control, and third valve means within said first control responsive to the deviation between a pressure function of the measured flow as modified by said inlet air condition responsive means and a pressure function of said speed responsive means for controlling said first valve means.

8. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, engine inlet air condition and engine speed responsive means within said first fuel control, and third valve means within said first fuel control responsive to the deviation between a pressure function of the measured flow as modified by said inlet air condition responsive means and a pressure function of said speed responsive means for controlling said first valve means.

9. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control.

10. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

11. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control.

12. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

13. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, said flow measuring means comprising a venturi section, engine parameter responsive means within said first fuel control, and third valve means within said first control responsive to the deviation between a pressure function of the measured flow as modified by means responsive to an engine parameter and a pressure function of means responsive to another engine parameter for controlling said first valve means.

14. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, said flow measuring means comprising a venturi section, engine parameter responsive means within said first fuel control, and third valve means within said first fuel control responsive to the deviation between a pressure function of the measured flow as modified by means responsive to an engine parameter and a pressure function of means responsive to another engine parameter for controlling said first valve means.

15. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, said flow measuring means comprising a venturi section, engine parameter responsive means within said first fuel control, third valve means within said first fuel control responsive to the deviation between a pressure function of the measured flow as modified by means responsive to an engine parameter and a pressure function of means responsive to another engine parameter and porting means in said second valve means making said first valve means responsive to said third valve means when fuel is delivered to the engine through said first fuel control.

16. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, said flow measuring means comprising a venturi section, engine parameter responsive means within said first fuel control, third valve means within said first fuel control responsive to the deviation between a pressure function of the measured flow as modified by means responsive to an engine parameter and a pressure function of means responsive to another engine parameter, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

17. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, said flow measuring means comprising a venturi section, engine parameter responsive means within said first fuel control, third valve means within said first fuel control responsive to the deviation between a pressure function of the measured flow as modified by means responsive to an engine parameter and a pressure function of means responsive to another engine parameter, and porting means in said second valve means making said first valve means responsive to said third valve means when fuel is delivered to the engine through said first fuel control.

18. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, said flow measuring means comprising a venturi section, engine parameter responsive means within said first fuel control, third valve means within said first fuel control responsive to the deviation between a pressure function of the measured flow as modified by means responsive to an engine parameter and a pressure function of means responsive to another engine parameter, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

19. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, said flow measuring means comprising a venturi section, engine inlet air condition and engine speed responsive means within said first fuel control, and third valve means within said first control responsive to the deviation between a pressure function of the measured flow as modified by said inlet air condition responsive means and a pressure function of said speed responsive means for controlling said first valve means.

20. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, said flow measuring means comprising a venturi section, engine inlet air condition and engine speed responsive means within said first fuel control, and third valve means within said first fuel control responsive to the deviation between a pressure function of the measured flow as modified by said inlet air condition responsive means and a pressure function of said speed responsive means for controlling said first valve means.

21. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, said flow measuring means comprising a venturi section, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control.

22. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, flow measuring means within said first fuel control, said flow measuring means comprising a venturi section, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

23. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, said flow measuring means comprising a venturi section, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control.

24. In combination, a turbojet engine, a fuel pump, a first fuel control for controlling the flow of fuel to said engine, a second fuel control for controlling the flow of fuel to said engine, first valve means for regulating the fuel flow delivered from the fuel pump, second valve means for supplying the fuel flow delivered from the fuel pump to either said first fuel control or said second fuel control, said second valve being manually operable, flow measuring means within said first fuel control, said flow measuring means comprising a venturi section, engine inlet air condition and engine speed responsive means within said first fuel control, third valve means within said first fuel control responsive to the deviation between a pressure function of the measured flow as modified by said inlet air condition responsive means and a pressure function of said speed responsive means, and porting means in said second valve means making said first valve means responsive to said third valve means when fuel is delivered to the engine through said first fuel control and making said first valve means operable to regulate the pressure differential between inlet and outlet of the second fuel control when fuel is delivered through said second fuel control.

25. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means.

26. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway.

27. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, said third valve means being operably connected to a governor.

28. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, fourth valve means for regulating the pressure drop through said third valve means.

29. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, said third valve means being operably connected to a governor, fourth valve means for regulating the pressure drop through said third valve means.

30. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, said third valve means being regulated by a governor and spring means.

31. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, th rd passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, said third valve means being regulated by a governor and spring means, said spring means being adjustable to vary the force it applies to said third valve means.

32. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, said third valve means being regulated by a governor and spring means, said spring means being adjustable to vary the force it applies to said third valve means, a control lever, said control lever being operable to adjust said spring means.

33. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position.

34. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway.

35. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, said fourth valve means being operably connected to a governor.

36. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, sixth valve means for regulating the pressure drop across said fourth valve means.

37. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, said fourth valve means being operably connected to a governor, sixth valve means for regulating the pressure drop across said fourth valve means.

38. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, said fourth valve means being regulated by a governor and spring means.

39. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, said fourth valve means being regulated by a governor and spring means, said spring means being adjustable to vary the force it applies to said fourth valve means.

40. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, said fourth valve means being regulated by a governor and spring means, said spring means being adjustable to vary the force it applies to said fourth valve means, a control lever, said control lever being operable to adjust said spring means.

41. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one poition and for connecting said fuel inlet to said second flow passageway in another position, fourth valve means in said flow passageway and fifth valve means in said second flow passageway, a control lever, said fourth and fifth valve means being operably connected to said lever.

42. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, said fourth valve means being regulated by a governor and spring means, said spring means being adjustable to vary the force it applies to said fourth valve means, a control lever, said control lever being operable to adjust said spring means and operate said fifth valve means.

43. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, said third valve means being regulated by a governor and spring means, said spring means being adjustable to vary the force it applies to said third valve means, fourth valve means for regulating the pressure drop through said third valve means.

44. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, a control lever, said fourth and fifth valve means being operably connected to said lever, sixth valve means for regulating the pressure drop across said fourth valve means.

45. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, a pump, third passageway means connecting the throat of said venturi to the inlet of said pump, fourth passageway means connecting the outlet of said pump to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, a second flow passageway from said fuel inlet to said fuel outlet, third valve means for connecting said fuel inlet to said first flow passageway in one position and for connecting said fuel inlet to said second flow passageway in another position, fourth valve means in said flow passageway and fifth valve means in said second flow passageway, said fourth valve means being regulated by a governor and spring means, said spring means being adjustable to vary the force it applies to said fourth valve means, a control lever, said control lever being operable to adjust said spring means and operate said fifth valve means, sixth valve means for regulating the pressure drop across said fourth valve means.

46. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with the rise in gas pressure across the engine compressor, said pressure regulating valve controlling the fuel pressure differential across said orifice, and means for varying said differential in accordance with the ratio of turbine discharge pressure to compressor discharge pressure.

47. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with the rise in gas pressure across the engine compressor, said pressure regulating valve controlling the fuel pressure differential across said orifice, and means for varying said differential in accordance with the ratio of turbine discharge pressure to compressor discharge pressure, said means including a spring, a member movable to modify the compression of said spring, and a device to move said member in accordance with the ratio of turbine discharge pressure to compressor discharge pressure.

48. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with the rise in gas pressure across the engine compressor, said pressure regulating valve controlling the fuel pressure differential across said orifice, and means for varying said differential in accordance with the ratio of turbine discharge pressure to compressor discharge pressure, said means including a spring, a member movable to modify the compression of said spring, and a device to move said member in accordance with the ratio of one engine gas pressure to another.

49. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with the rise in gas pressure across the engine compressor, said pressure regulating valve controlling the fuel pressure differential across said orifice, and means for varying said differential in accordance with the ratio of turbine discharge pressure to compressor discharge pressure, said means including a spring, a member movable between two adjustable stops to modify the compression of said spring, and a device to move said member in accordance with the ratio of turbine discharge pressure to compressor discharge pressure.

50. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with the rise in gas pressure across the engine compressor, said pressure regulating valve controlling the fuel pressure differential across said orifice, and means for varying said differential between a maximum and a minimum value in accordance with the ratio of turbine discharge pressure to compressor discharge pressure.

51. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with the rise in gas pressure across the engine compressor, said pressure regulating valve controlling the fuel pressure differential across said orifice, and means for varying said differential in accordance with the ratio of turbine discharge pressure to compressor discharge pressure, said means including a spring, a member movable between two adjustable stops to modify the compression of said spring, and a device to move said member in accordance with the ratio of one engine gas pressure to another.

52. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with the rise in gas pressure across the engine compressor, said pressure regulating valve controlling the fuel pressure differential across said orifice, and means for varying said differential in accordance with the ratio of turbine discharge pressure to compressor discharge pressure, said means including a spring, a member movable between two stops to modify the compression of said spring, and a device to move said member in accordance with the ratio of one engine gas pressure to another.

53. In combination with an engine including a compressor, turbine and afterburner, a control for regulating the fuel supply to the afterburner, said control having a fuel inlet and a fuel outlet with a metering orifice and a pressure regulating valve therebetween, the area of said metering orifice being varied in accordance with a gas pressure differential in said engine, said pressure regulating valve controlling the fuel pressure differential across said orifice, and means for varying said fuel pressure differential between a maximum and minimum value in accordance with a gas pressure differential in said engine.

54. In combination with an engine including an afterburner, an afterburner fuel control, a passageway for supplying fuel from said control to the afterburner, pump means for supplying fuel to said afterburner fuel control, means for operating said pump means, valve means for initiating and stopping the supply of fuel to said afterburner, said valve means having a first port interposed in said passageway for opening or closing said passageway, a high pressure fluid source, a low pressure fluid source, a second passageway connecting said means for operating said pump means to said valve means, said valve means having a second port for connecting said high pressure fluid to said means for operating said pump means when said first port is open and means for connecting said low pressure fluid to said means for operating said pump means when said first port is closed, said pump means being arranged to supply fuel to said control when said high pressure fluid is supplied to said means for operating said pump means.

55. In combination with an engine including an afterburner, an afterburner fuel control, a passageway for supplying fuel from said control to the afterburner, pump means for supplying fuel to said afterburner fuel control, means for operating said pump means, lever operated valve means for initiating and stopping the supply of fuel to said afterburner, said valve means having a first port interposed in said passageway for opening or closing said passageway, a high pressure fluid source, a low pressure fluid source, a second passageway connecting said means for operating said pump means to said valve means, said valve means having a second port for connecting said high pressure fluid to said means for operating said pump means when said first port is open and means for connecting said low pressure fluid to said means for operating said pump means when said first port is closed, said pump means being arranged to supply fuel to said control when said high pressure fluid is supplied to said means for operating said pump means.

56. In combination with an engine including an afterburner, an afterburner fuel control, a passageway for supplying fuel from said control to the afterburner, pump means for supplying fuel to said afterburner fuel control, means for operating said pump means, lever operated valve means for initiating and stopping the supply of fuel to said afterburner, said valve means having a first port interposed in said passageway for opening or closing said passageway, a high pressure fluid source, a low pressure fluid source, a second passageway connecting said means for operating said pump means to said valve means, said valve means having a second port for connecting said high pressure fluid to said means for operating said pump means when said first port is open and means for connecting said low pressure fluid to said means for operating said pump means when said first port is closed, said pump means being arranged to supply fuel to said control when said high pressure fluid is supplied to said means for operating said pump means, said low pressure fluid being supplied from said passageway between said valve means and said afterburner.

57. In combination with an engine including a compressor and an afterburner, an afterburner fuel control, a passageway for supplying fuel from said control to the afterburner, fuel pump means for supplying fuel to said afterburner fuel control, means for operating said pump including a gas driven turbine, a second passageway from said compressor to said last named means for supplying gas, lever operated valve means for initiating and stopping the flow of fuel to said afterburner, said valve means having a first port interposed in said first passageway for opening or closing said passageway, a high pressure fluid source, a second valve means interposed in said second passageway, a third passageway connecting said second valve means to said first valve means, said first valve means having a second port for connecting said high pressure fluid to said second valve means when said first port is open and means for connecting said second valve means to the pressure in said first passageway when said first port is closed, said second valve means being arranged to admit gas from said second passageway to said turbine for driving said pump means.

58. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, means for producing a pressure differential, third passageway means connecting the throat of said venturi to said producing means, fourth passageway means connecting said producing means to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means.

59. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, means for producing a pressure differential, third passageway means connecting the throat of said venturi to said producing means, fourth passageway means connecting said producing means to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway, said third valve means being operably connected to a governor.

60. A fuel control having a housing, a fuel inlet to said housing, a fuel outlet from said housing, a flow passageway from said fuel inlet to said fuel outlet, a venturi in said flow passageway, a chamber in said housing, a movable wall located in said chamber, a first passageway means connecting the inlet of said venturi to said chamber on one side of said wall, a second passageway means connecting the throat of said venturi to said chamber on said same side of said wall, said first passageway means having first valve means therein, said second passageway means having a fixed orifice therein, means for producing a pressure differential including two connections, third passageway means connecting the throat of said venturi to one connection of said producing means, fourth passageway means connecting the other connection of said producing means to said chamber on the other side of said wall, a fifth passageway means within said housing, second valve means in said fifth passageway means, said movable wall being operably connected to said second valve means in said fifth passageway means, sixth passageway means connecting the flow passageway adjacent its outlet to the fifth passageway means, a fixed orifice in said sixth passageway means, third valve means in said flow passageway.

References Cited in the file of this patent

UNITED STATES PATENTS

| | | |
|---|---|---|
| 2,520,434 | Robson | Aug. 29, 1950 |
| 2,596,815 | Keil | May 13, 1952 |
| 2,612,944 | Orr | Oct. 7, 1952 |
| 2,700,275 | Chandler et al. | Jan. 25, 1955 |
| 2,702,560 | Bobier | Feb. 22, 1955 |
| 2,705,864 | Peters | Apr. 12, 1955 |

FOREIGN PATENTS

| | | |
|---|---|---|
| 941,556 | France | July 19, 1948 |